Figure 1:
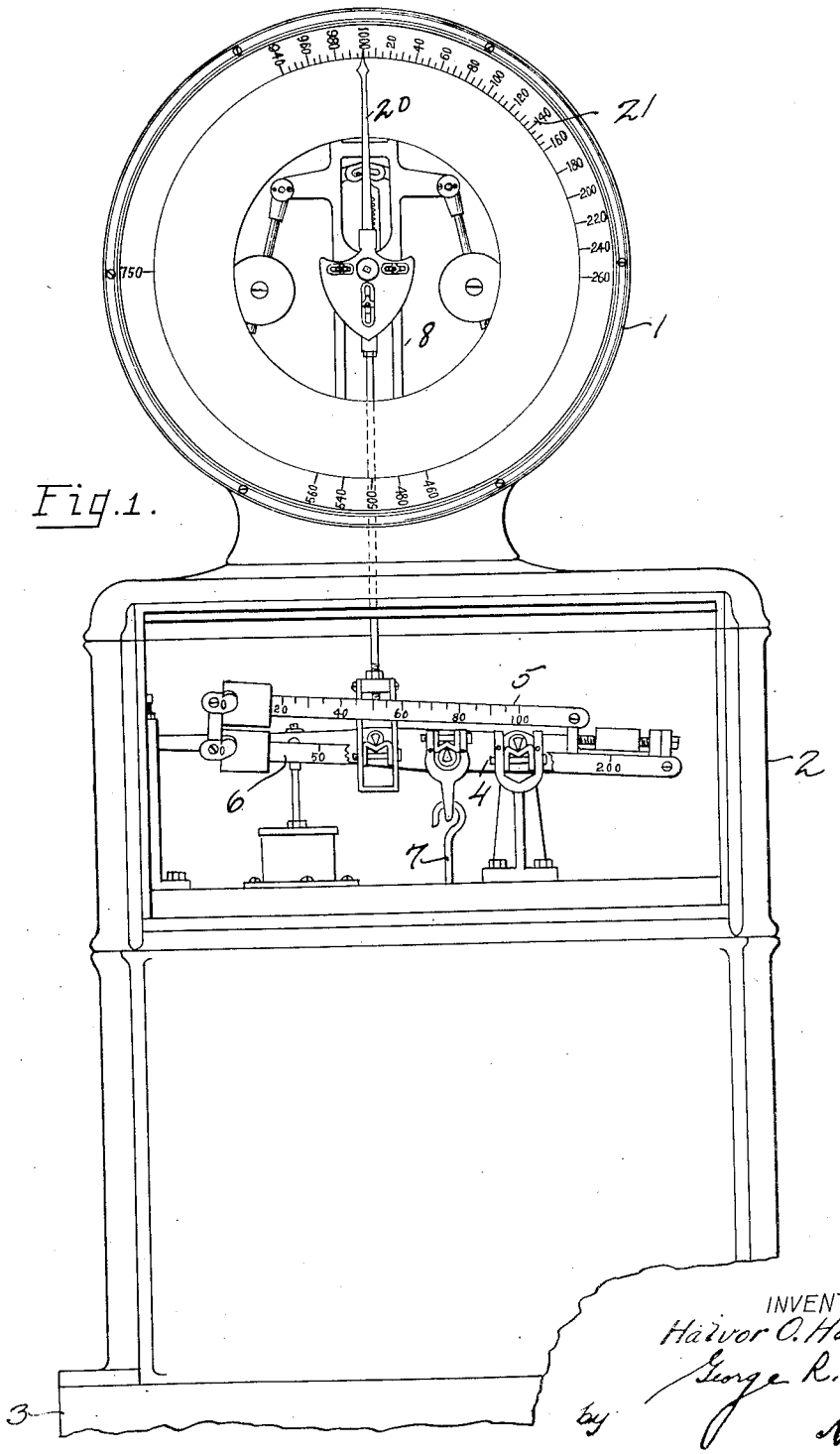

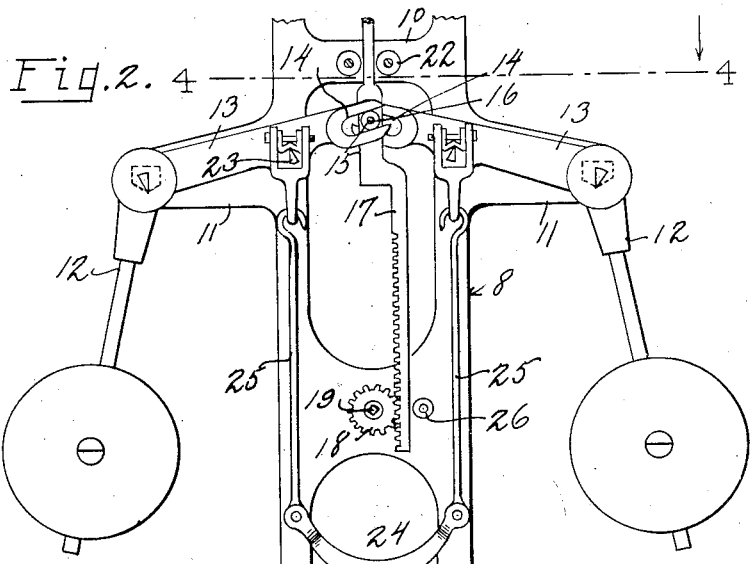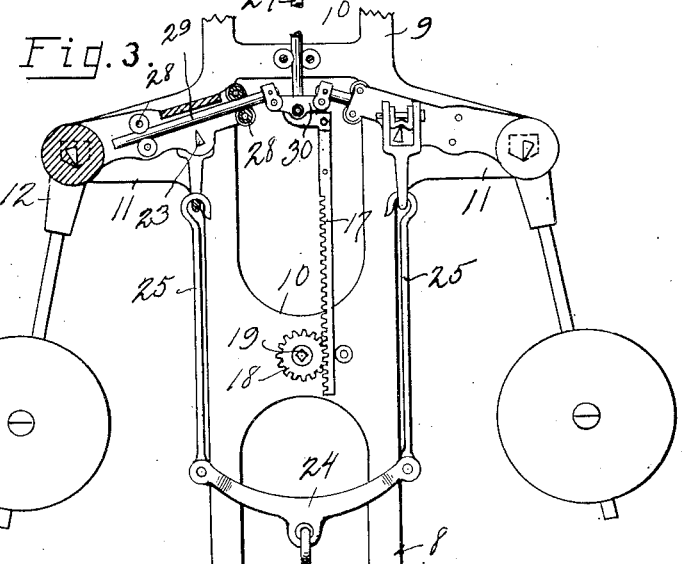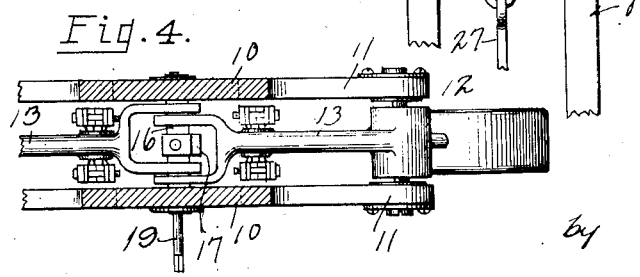

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

PENDULUM WEIGHING-SCALE.

1,364,369.      Specification of Letters Patent.      Patented Jan. 4, 1921.

Application filed December 21, 1916. Serial No. 138,196.

*To all whom it may concern:*

Be it known that I, HALVOR O. HEM, a citizen of the United States, residing at Toledo, in the county of Lucas and State of Ohio, have invented certain new and useful Improvements in Pendulum Weighing-Scales, of which the following is a specification.

This invention relates to pendulum weighing scales and more specifically to the weighing mechanism thereof.

One of the characteristics of pendulum scales having fixed bearings and a link and pivot connection with the main lever is that as the pendulum weight swings outwardly and the pivot and link move downwardly, step by step, the leverage of the pendulum gradually changes and the movement of the indicator over the chart is not uniform.

This invention has for its primary object to overcome the objection to scales of this type and enable the use of pendulums resting in fixed bearings and positively connected to the actuating levers with evenly graduated indicating charts by providing means for uniformly driving the index hand from the pendulums despite the uneven movement of the pendulums as successive increments are added to the load.

Other objects and advantages will readily appear from the following description, wherein preferred embodiments of my invention are described and particularly pointed out in the subjoined claims.

Referring to the drawings, which are merely illustrations of my invention, and wherein similar reference characters designate corresponding parts throughout the several views, Figure 1 is a front elevation of a scale equipped with my invention; Fig. 2 is an enlarged elevation of the weighing mechanism thereof; Fig. 3 is a similar view, partly in section, of a modified form of my invention; Fig. 4 is a horizontal sectional view taken on the line 4—4 of Fig. 2.

Referring first to the construction illustrated in Figs. 1 and 2, the numeral 1 designates a housing inclosing the weighing mechanism of the scale and supported upon a casing 2 communicating with a base 3 which supports the usual platform and platform levers (not shown). A main lever 4 fulcrumed within the casing 2 carries tare and increased capacity beams 5 and 6 of any desired construction, and is operatively connected to the afore-mentioned platform levers by means of the lower steelyard 7.

Rigidly supported within the housing 1 is a frame 8 comprising four vertically-disposed pillars 9 connected together by crossbars 10 and having suitable supporting members 11 formed thereon and projecting outwardly therefrom. A pair of pendulums 12 pivotally supported in bearings carried by said members 11 are provided with inwardly-extending arms 13 having slotted recesses 14 in the ends thereof arranged side by side and adapted to cross each other at the normal or zero position of the scale. Supported within the recesses 14 are a pair of spaced rollers 15 mounted upon a transverse shaft 16 which carries a vertically-disposed rack-bar 17 meshing with a pinion 18 keyed upon the indicating shaft 19. An upwardly-projecting portion of the rack-bar 17 extends above the arms 13 and engages between a pair of guide rollers 22 to maintain the rack-bar in its vertical movements, and a lower guide roller 26 engages the back of the rack-bar to hold it in mesh with the pinion while guiding its vertical movements. An index hand 20 fixed upon the shaft 19 is adapted to indicate the weight of a commodity being weighed upon the evenly graduated chart 21. The arms 13 are provided with knife-edge pivots 23 connected to an equalizer bar 24 by means of the link and stirrup connection 25, the equalizer bar being centrally connected to the main lever 4 through the upper steelyard 27.

In operation, when a load is placed upon the platform of the scale, a pull is exerted through the various platform and intermediate levers to the equalizer bar 24 and is then transmitted to the arms 13 of the pendulums 12 through the links and stirrups 25, whereby the pendulum weights are elevated sufficiently to offset the weight of the load, and the slotted ends of the pendulum arms 13 are pulled downwardly, allowing the rollers 15 and the rack-bar to move vertically downward to rotate the pinion 18 to operate the indicating mechanism of the scale. The rack-bar 17 is restrained to travel in a true vertical line by reason of its mounting between the upper guide rollers 22 and the lower guide roller 26. The transverse shaft 16 carrying the rollers 15 which engage in the slotted ends of the pendulum arms is so positioned that it is always in alinement with the knife edges of the fulcrum pivots and the pivots 23 of the pendulum throughout the entire range of movements of the pendulums. Thus, in the initial or zero position of the scale (shown in Fig. 2) the pendulum pivots and the shaft 16 are in alinement, with the rollers fitting within the V-shaped notch formed by the intersection of the slotted arms, and as the pendulum arms are swung downwardly the shaft 16 falls vertically downwardly, the rollers 15 moving upon the walls of the slots in the pendulum arms. It will be apparent that when the pendulum arms are in a true horizontal position the rollers will be at their nearest approach to the fulcrum pivots of the pendulums, and as the pendulums swing in either direction from such horizontal line the rollers must move away from the fulcrum pivots. It has been found that by allowing the rollers to move in and out within the slotted ends of the pendulum arms while restraining the rack-bar carrying the rollers to move in a true vertical line, that the movements of the rack-bar will be regulated to move uniformly so as to enable the use of an evenly graduated chart in the scale. The relation that must be maintained between the shaft 16 coöperating with both the rack-bar and the pendulum arms can be expressed with reference to the horizontal position of the pendulum arms as follows: The distance between the fulcrum pivot and the shaft 16 varies as the secant of the angle traversed by the pendulum arms on each side of the horizontal line. It is to be understood that while the horizontal line connecting the pivot edge is shown as the central position of the pendulums, the pendulums need not always be so arranged. If the pendulums swing through a greater arc on one side of the horizontal line than on the other, or if they swing entirely on one side of the horizontal line, the relation still exists, the distance between the fulcrum pivot and point of connection with the equalizer bar varying always as the secant of the angle traversed by the pendulum arm on either side of the horizontal line. When this relation is maintained, the rack is controlled to move uniformly in a vertical direction despite the change in leverage of the pendulums during their travel.

Referring to the embodiment illustrated in Fig. 3, the pendulum arms 13 are provided with spaced pairs of guide rollers 28 separated sufficiently to receive the extension rods 29 which are secured at their inner ends to an equalizer bar 30, the rods 29 being adapted to slide radially in and out through the rollers 28 while maintaining the points of connection of the equalizer bar and the rods in direct alinement with the edges of the pendulum pivots. The rack-bar 17 is pivoted to the equalizer bar 30 substantially centrally thereof and is restrained to move vertically, as in the first described embodiment of my invention. During the operation of this embodiment the rods 29 slide inwardly and outwardly as the pendulum arms approach and recede from their central horizontal position while maintaining their points of connection with the equalizer bar in direct alinement with the pendulum pivots.

While it will be apparent that the illustrated embodiments of my invention herein disclosed are well calculated to adequately fulfil the objects primarily stated, it is to be understood that the invention is susceptible to variation, modification and change without departing from the spirit and scope of the invention as set forth in the subjoined claims.

Having described my invention, I claim:

1. In a weighing scale, the combination of a pair of opposed pendulums fulcrumed upon fixed bearings, indicating mechanism, and means variable in length carried by the pendulums and engaging the indicating mechanism whereby uniform movement is imparted to the latter when the former are rocked as successive increments are weighed upon the scale.

2. In a weighing scale, the combination of a pair of opposed pendulums fulcrumed upon fixed bearings, indicating mechanism, arms carried by the pendulums and connected to the indicating mechanism, and means to vary the effective length of said arms whereby uniform movement is imparted to the indicating mechanism when the pendulums are rocked as successive increments of load are weighed upon the scale.

3. In a scale, the combination of a two-arm pendulum fulcrumed upon fixed bearings carried by the scale, indicating mechanism including a rack connected with one arm of the pendulum and arranged to travel in a vertical plane, the pendulum arm connected with the rack being arranged to vary as to length as the secant of the angle traversed by said arm on either side of its horizontal position.

4. In a scale, the combination of a two-armed pendulum fulcrumed upon fixed bearings carried by the scale, indicating mechanism including a rack, and means connecting one arm of the pendulum with the rack adapted to vary the distance between the pendulum fulcrum and the point of connection with the rack as the secant of the angle traversed by said pendulum arm on either side of its horizontal position.

5. In a scale, the combination of a two-armed pendulum fulcrumed upon fixed bearings carried by the scale, indicating mechanism including a rack, and means carried by the pendulum and connecting one arm of the pendulum with the rack adapted to vary the distance between the pendulum fulcrum and the point of connection with the rack as the secant of the angle traversed by said pendulum arm on either side of its horizontal position.

6. In a scale, the combination of a two-armed pendulum fulcrumed upon fixed bearings carried by the scale, indicating mechanism including a rack, and means adjustably mounted upon the pendulum and connecting one arm of the pendulum with the rack adapted to vary the distance between the pendulum fulcrum and the point of connection with the rack as the secant of the angle traversed by said pendulum arm on either side of its horizontal position.

7. In a scale, the combination of a platform, a pendulum fulcrumed upon fixed bearings carried by the scale and having two arms of unequal length, its short arm being connected with the platform so as to be rocked downwardly upon imposition of a load upon the platform, indicating mechanism including a rack, and means carried by the short arm of the pendulum and engaging the rack whereby the length of this rack-actuating arm is varied and uniform rotative movement is imparted to the indicating mechanism as successive increments are imposed upon the platform.

8. In a scale, the combination of a pair of opposed two-armed pendulums fulcrumed upon fixed bearings carried by the scale, indicating mechanism including a rack connected with one arm of each pendulum and arranged to travel in a vertical plane, the length of the pendulum arms connected with the rack varying as the secant of the angle traversed by said arms on either side of their horizontal positions.

9. In a scale, the combination of a pair of opposed two-armed pendulums fulcrumed upon fixed bearings carried by the scale, indicating mechanism including a rack, and means connecting one arm of each pendulum with the rack adapted to vary the distance between the fulcra of the pendulums and the point of connection with the rack as the secant of the angle traversed by said pendulum arms on either side of their horizontal positions.

10. In a scale, the combination of a pair of opposed two-armed pendulums fulcrumed upon fixed bearings carried by the scale, indicating mechanism including a rack, and means carried by the pendulums and connecting one arm of each pendulum with the rack adapted to vary the distance between the fulcra of the pendulums and the point of connection with the rack as the secant of the angle traversed by said pendulum arms on either side of their horizontal positions.

11. In a scale, the combination of a pair of opposed two-armed pendulums fulcrumed upon fixed bearings carried by the scale, indicating mechanism including a rack, and means adjustably mounted upon the pendulums and connecting one arm of each pendulum with the rack adapted to vary the distance between the fulcra of the pendulums and the point of connection with the rack as the secant of the angle traversed by said pendulum arms on either side of their horizontal positions.

12. A weighing mechanism for weighing scales, comprising oppositely-disposed pendulums pivotally mounted within the scale, indicating means, and slidable means carried by the pendulums and connecting said pendulums and said indicating means for imparting a uniform movement to the latter when the former are rocked as successive increments are weighed upon the scale.

13. In a weighing scale, in combination with the indicating mechanism thereof, a frame rigidly secured within the scale, oppositely-disposed pendulums pivoted upon said frame, slidable means carried by the pendulums and connected to said indicating means, and operating means pivotally connected with said pendulums.

14. In a weighing scale, the combination of indicating mechanism including a rack, a frame rigidly secured within the scale, oppositely-disposed pendulums pivoted upon said frame and slidably connected to said rack, and operating means pivotally connected with said pendulums.

15. A weighing mechanism for weighing scales, comprising a support rigidly secured within said scale, oppositely-disposed pendulums pivotally mounted upon said support, operating means pivotally connected to said pendulums, indicating means, and means connected with said indicating means and slidable within said pendulums whereby the distance between the fulcra of the pendulums and the point of connection with the indicating mechanism varies as the secant of the angle traversed by said pendulum arms on either side of their horizontal positions.

16. In a weighing scale, the combination of a pair of opposed two-armed pendulums fulcrumed upon fixed bearings, indicating mechanism including a rack, and means mounted upon the adjacent arms of each pendulum and connected with the rack whereby the distances from the pendulum fulcrums to the point of connection with the rack vary as the pendulums are rocked.

17. In a weighing scale, the combination of a pair of opposed two-armed pendulums fulcrumed upon fixed bearings, indicating mechanism including a rack, and slidable means mounted upon the adjacent arms of each pendulum and connected with the rack whereby the distances from the pendulum fulcrums to the point of connection with the rack vary as the pendulums are rocked.

HALVOR O. HEM.

Witnesses:
C. F. MILLER, Jr.,
EDW. F. ULRICH.